United States Patent [19]

Guerard et al.

[11] Patent Number: 4,707,641

[45] Date of Patent: Nov. 17, 1987

[54] DRIVING MECHANISM FOR WIPER BLADES

[75] Inventors: Norbert Guerard, Virton, Belgium; Christian Beneteau, Gorcy, France

[73] Assignee: Champion Spark Plug Europe S.A., Binche, Belgium

[21] Appl. No.: 924,429

[22] Filed: Oct. 29, 1986

[30] Foreign Application Priority Data

Nov. 13, 1985 [FR] France .................. 85 16760

[51] Int. Cl.$^4$ ................................ B60S 1/36
[52] U.S. Cl. .................... 318/443; 318/480;
    318/DIG. 2; 15/250.17; 15/250.21; 15/250.23
[58] Field of Search .......... 318/443, 444, DIG. 2,
    318/480; 15/250 R, 250.13, 250.15, 250.17,
    250.21, 250.23, 250.29, 250.30, 250.31, 250.32,
    250.33, 250.34

[56] References Cited

U.S. PATENT DOCUMENTS 4,584,734  4/1986  Leroy et al. ................ 15/250

Primary Examiner—Bentsu Ro
Attorney, Agent, or Firm—Wood, Dalton, Phillips, Mason & Rowe

[57] ABSTRACT

The invention relates to driving mechanism for wiper blades of, for example, motor vehicles wherein two motors (14, 15) impart to the wiper arm, or to at least one of its elements, not only an oscillating, but also a translational (radial) movement. The oscillating movement is imparted to the wiper arm by means of a drive shaft (12) actuated by a first motor (14) and the radial movement is imparted to the wiper arm by means of the drive shaft (13) of a second motor (15) and by means of a conical gear (9a, 9b) associated with a screw/nut system (8, 7) wherein the nut (7) moves radially when the drive shaft (13) of the second motor (15) is rotating. The two movements of the wiper arm are controlled and regulated by an opto-electronical system comprising two slotted discs (14a, 15a), two reading heads (14b, 15b) and a micro-processor (19). Several embodiments of the invention are possible.

15 Claims, 18 Drawing Figures

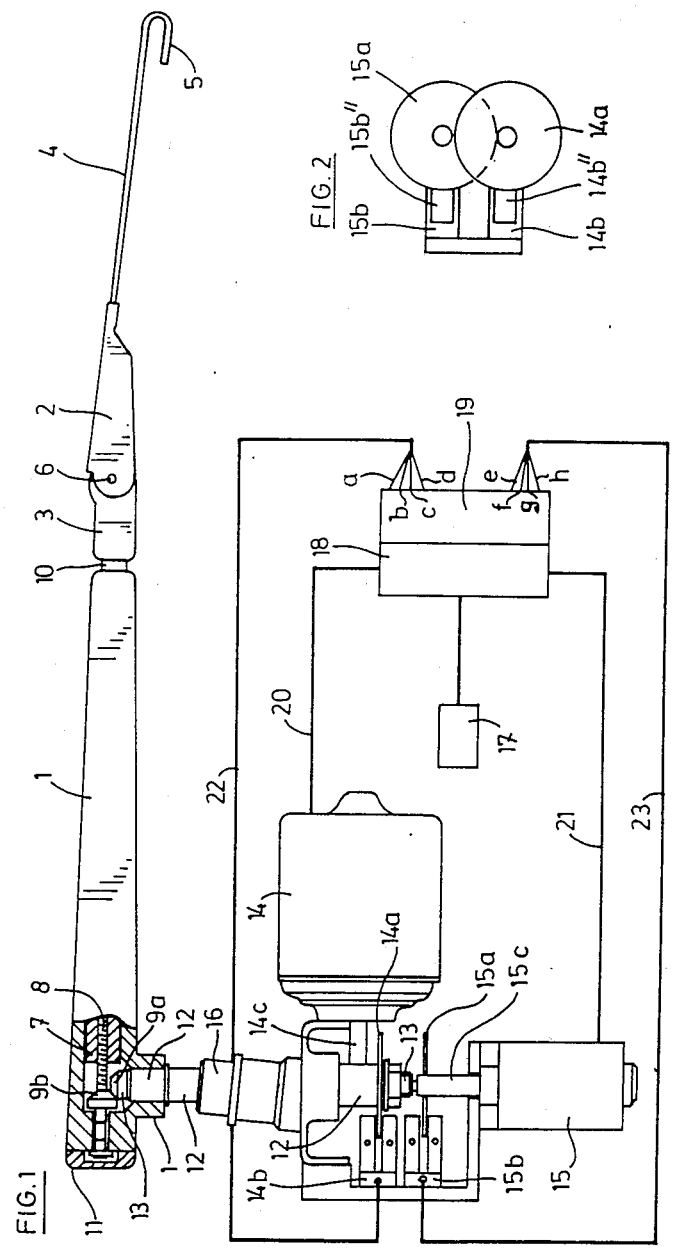

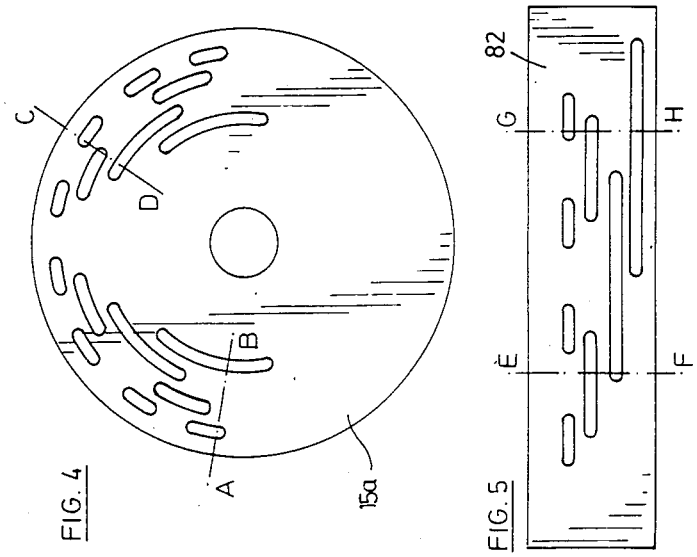
FIG. 4
FIG. 5
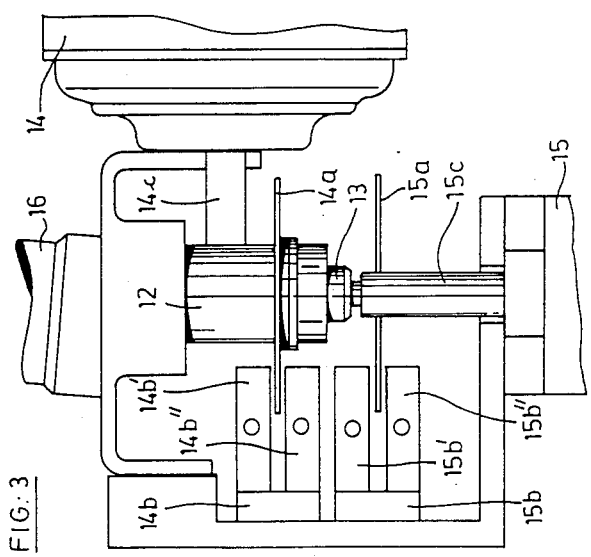
FIG. 3

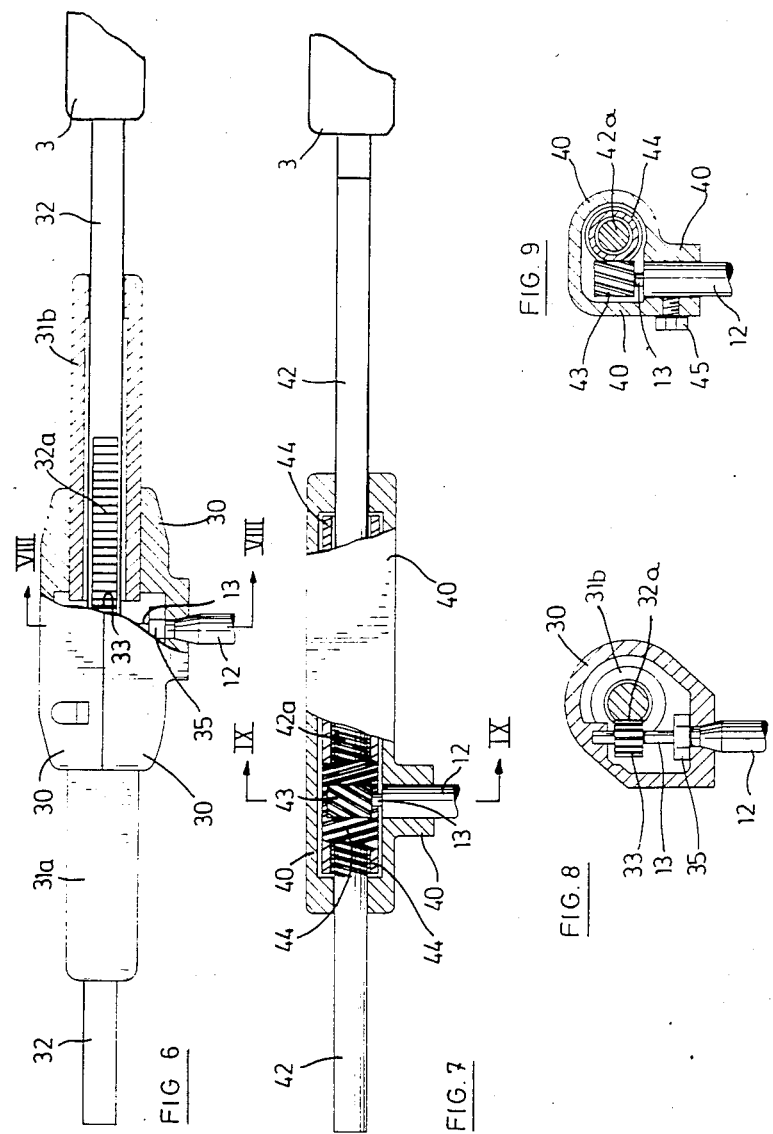

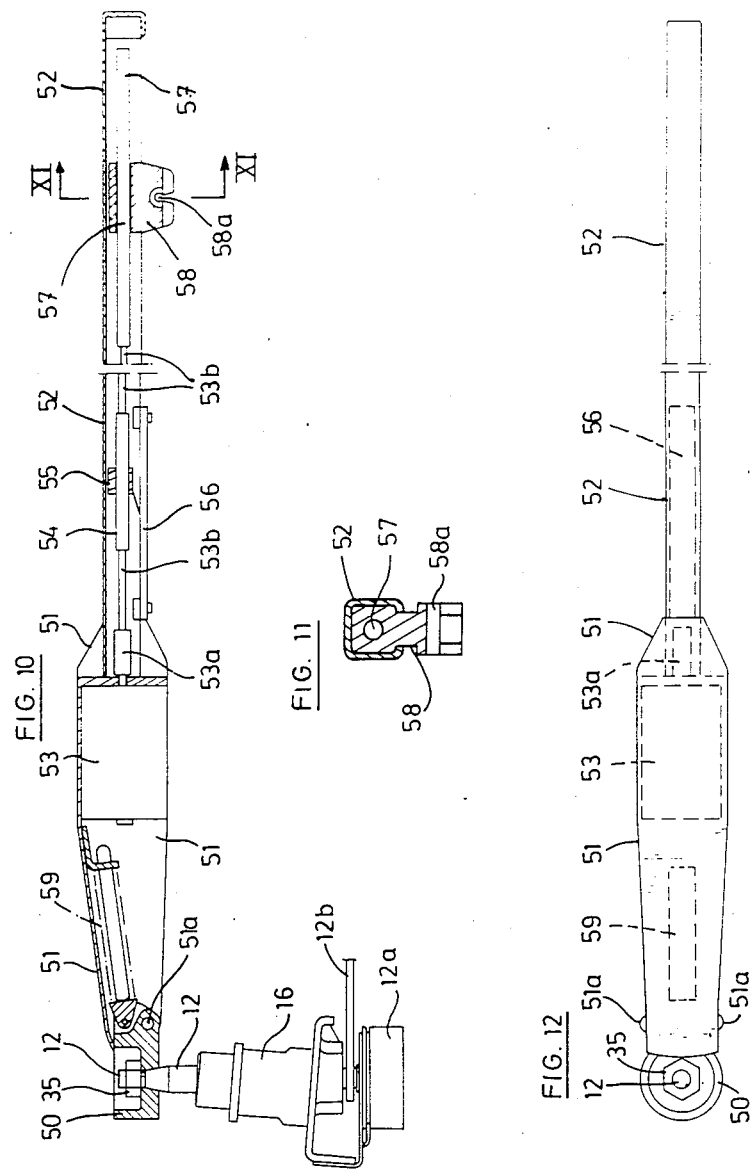

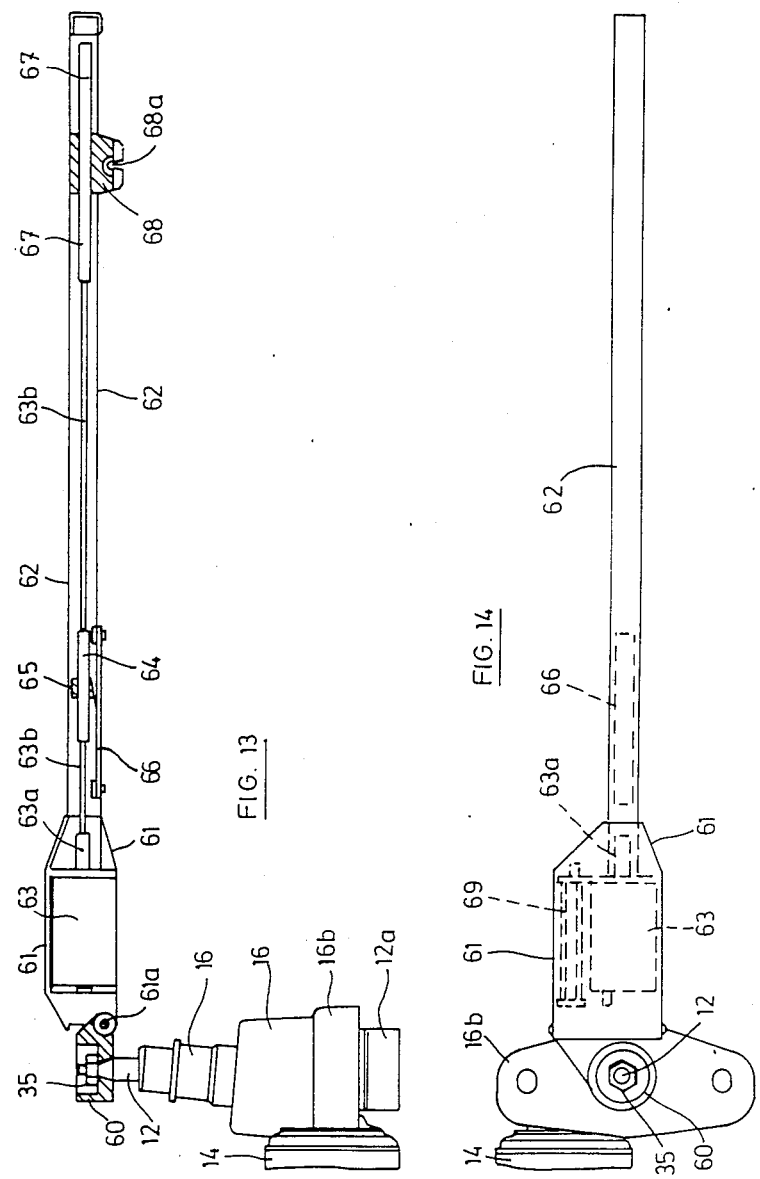

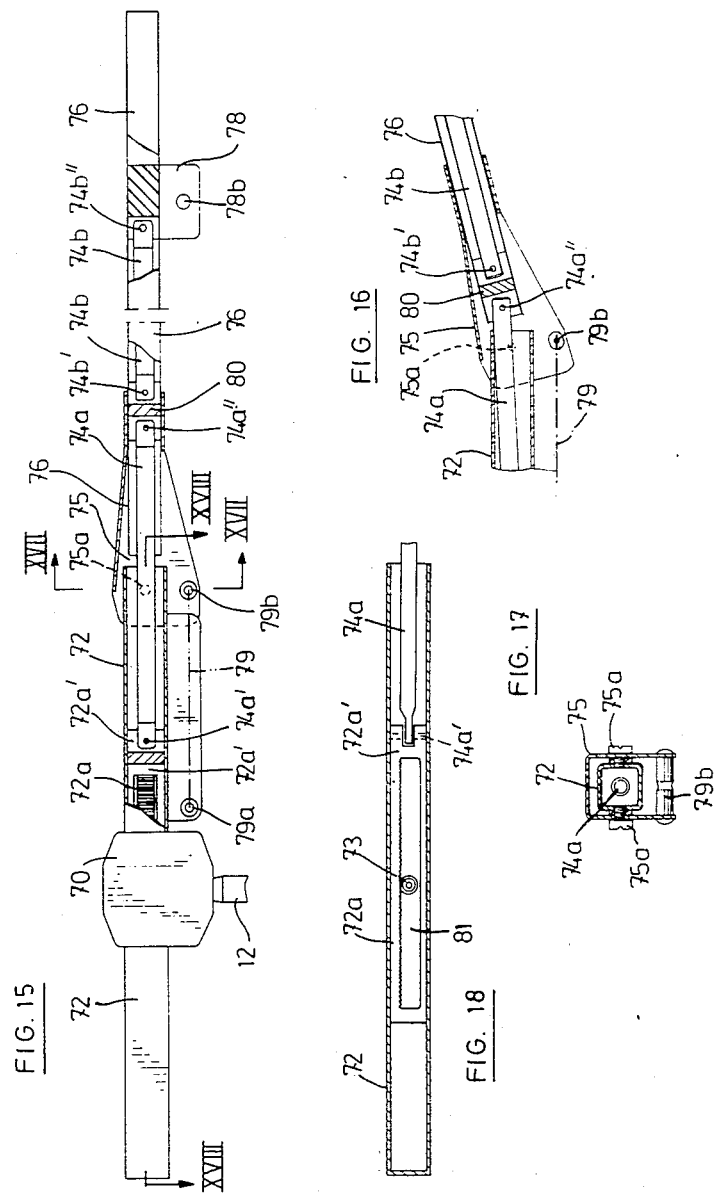

DRIVING MECHANISM FOR WIPER BLADES

FIELD OF THE INVENTION

This invention relates to windshield wiper mechanisms and more particularly to a driving mechanism for oscillating a wiper arm and at the same time radially moving one element of the wiper arm.

BACKGROUND OF THE INVENTION

The present invention relates to a driving mechanism for wiper blades for example motor vehicles, comprising an oscillating wiper arm of which at least one element is capable of moving radially with respect to a first drive shaft. The first drive shaft imparts the oscillating movement to said wiper arm and is actuated by a first motor located beneath the hood of the vehicle.

Wiper driving mechanisms of this type, i.e. wiper driving mechanisms of which at least one of the elements of the wiper arm is capable of moving radially with respect to the drive shaft of the wiper arm, are known in prior art. In the known systems it is generally, if not always, the motor which imparts the oscillating movement to the wiper arm that also imparts the radial movement to at least one element of the arm, said radial movement being obtained by means of a gear, generally a planet gear, and/or by means of rod systems.

A first disadvantage of the known systems is the fact that the planet gears and the rods must be located in a relatively large housing which is located at the level of the wiper arm itself and which consequently give a non-aesthetical appearance to said arm.

A second disadvantage of the known systems is the fact that the planet gears and the rods must be designed especially for each type of vehicle, or, more exactly, for each type of windshield. In other words, in the known systems given gears/rods can only be used on one single type of vehicle or on one single type of windshield.

SUMMARY OF THE INVENTION

A first object of the invention is to eliminate the above mentioned disadvantages. A second object of the invention is to provide a driving mechanism and wiper system of which the wiper blade is capable of wiping the largest possible surface on a given windshield. A third object of the invention is to provide a wiper mechanism which can be used without modification on the largest possible types of windshields.

It is to be noted that the principle of the driving mechanism according to the invention can be used on all types of windshields, but that for relatively small or relatively large windshields the dimensions of the mechanism must possibly be adapted.

The driving mechanism according to the invention is substantially characterized by the fact that a second motor imparts the radial movement to the element capable of moving radially with respect to the first drive shaft.

Depending on the different embodiments the driving mechanism according to the invention is also particularized either by the fact that the second motor is located beneath the hood of the vehicle, or by the fact that the second motor is located above the hood of the vehicle, i.e. for example inside the wiper arm.

Another feature of the driving mechanism according to the invention is the fact that the radial movement of said element or elements of the wiper arm is controled as a function of the angular position of said arm either by an opto-electronical/micro-processor system, or by a potentiometrical/micro-processor system.

Further features of the driving mechanism according to the invention will be better understood when reading the following description of several embodiments in conjunction with the appended drawings, wherein:

BRIEF DESCRIPTION OF THE DRAWINGS

FIG. 1 is an elevational view, schematic and partially in section, of the driving mechanism according to the first embodiment of the invention;

FIG. 2 is a schematic plan view of a detail of FIG. 1;

FIG. 3 is an elevational view, at a larger scale, of certain elements of FIG. 1;

FIG. 4 is a plan view, at a larger scale, of one of the elements of FIG. 3;

FIG. 5 is a plan view, at a larger scale, of an element which can replace one of the elements of FIGS. 10 and 13;

FIG. 6 is a partial elevational view, schematic and partially in section, of the driving mechanism according to the second embodiment of the invention;

FIG. 7 is a partial elevational view, schematic and partially in section, of the driving mechanism according to the third embodiment of the invention;

FIG. 8 is a schematic section along line VIII—VIII of the driving mechanism of FIG. 6;

FIG. 9 is a schematic section along line IX—IX of the driving mechanism of FIG. 7;

FIG. 10 is a partial elevational view, schematic and partially in section, of the driving mechanism according to the fourth embodiment of the invention;

FIG. 11 is a schematic section along line XI—XI of the driving mechanism of FIG. 10;

FIG. 12 is a schematic plan view of the driving mechanism of FIG. 10;

FIG. 13 is a partial elevational view, schematic and partially in section, of the driving mechanism according to the fifth embodiment of the invention;

FIG. 14 is a schematic plan view of the driving mechanism of FIG. 13;

FIG. 15 is a partial elevational view, schematic and partially in section, of the driving mechanism according to the sixth embodiment of the invention;

FIG. 16 is a reproduction of certain elements of the driving mechanism of FIG. 15, wherein said elements are differently positioned one with respect to the other;

FIG. 17 is a section along line XVII—XVII of the driving mechanism of FIG. 15;

FIG. 18 is a schematic section along line XVIII—XVIII of the driving mechanism of FIG. 15.

BEST MODE FOR CARRYING OUT THE INVENTION

It is to be noted that the terms "oscillating wiper arm", "wiper arm" and "arm" designate all the elements to which the drive shaft 12 (FIGS. 1, 3, 6, 7, etc.) imparts an oscillating movement. Thus the wiper arm of the first embodiment (FIG. 1) of the invention comprises the following elements: a housing 1, a housing 2, a mounting head 3, an extension rod 4, a hook 5, a rivet 6, a nut 7, a screw 8, a conical gear 9b, an extension rod 10 and a cap 11.

FIG. 1 furthermore shows the control and regulating system of this arm. Said control and regulating system comprises the following parts or elements: the first drive shaft 12, the second drive shaft 13, the gear 9a, the first motor 14 and its shaft 14c, the second motor 15 and its shaft 15c, the housing 16, the battery 17, the power circuits 18, the micro-processor 19 with its entries a, b, c, d, e, f, g, h, the electric cables 20, 21, 22, 23, the slotted discs 14a, 15a (FIGS. 1, 2, 3) and the opto-electronical reading heads 14b, 15b.

The shaft 14c of the first motor 14 imparts an oscillating movement to the first drive shaft 12 to which the slotted disc 14a is rigidly attached. Thus the disc 14a oscillates with the shaft 12. The oscillating movement of the shaft 12 and of the disc 14a is transmitted to the wiper arm via the housing 1 which is rigidly attached to the shaft 12, shaft 12 which moreover is hollow and through which passes the second drive shaft 13.

The shaft 15c of the second motor 15 imparts a rotational movement (in both directions) to the second drive shaft 13. The shaft 15c of the motor 15 also imparts a rotational movement to the slotted disc 15a via a reducing gear. The disc 15a thus always rotates in the opposite direction of the motor 15, but at a reduced speed. The reducing gear is not represented on the drawings. It is however to be noted that the relative location of the slotted discs 14a, 15a is shown on FIG. 2 and that in FIG. 1 the slotted disc 15a is located behind the shaft 15c of the motor 15.

As an example one of the slotted discs 14a, 14b is shown at an enlarged scale in FIG. 4. Each slotted disc is provided with a series of elongate openings which are disposed on four concentric circles. The opto-electronical reading heads 14b, 15b, which each comprise an upper portion and a lower portion 14b″, 15b″ (FIG. 3), read the discs along their radius. Thus at B-A (FIG. 4) the reading head reads for example 1001 and at C-D it reads 0111. Each reading head 14b, 15b thus can transmit, for each position of the respective disc and via the electrical cables 22, 23, an information of four bits to the microprocessor 19.

The eight bits thus received "at each instant" by the micro-processor 19 inform it on the instant position of the two slotted discs 14a, 14b and thus respectively on the instant angular position of the first (12) and of the second (13) drive shaft. Moreover, the angular position of the first drive shaft 12 determines the angular postion of the wiper arm and, as will be explained hereunder, the angular position of the second drive shaft 13 determines the position of the element or elements of the wiper arm which are capable of moving radially with respect to the first drive shaft 12.

In other words, the micro-processor 19 knows at each instant the exact position on the windshield of the element or elements of the wiper arm which are capable of moving radially with respect to the first drive shaft 12 and in particular the position of the element (3, 58, 68, 78) of the wiper arm to which the wiper blade (not shown) is attached.

The micro-processor 19 is programmed not only as a function of the configuration of the windshield, but also as a function of the form of the wiping pattern which is desired on the windshield. When the driving mechanism according to the invention is working the micro-processor 19 treats the information it receives in accordance with a pre-established programme and it gives instructions to the two motors 14, 15 via the power circuits 18 and, respectively, via the electrical cables 20, 21.

The instructions which the micro-processor 19 sends to the first motor 14 are essentially instructions for changing the direction of rotation, i.e. for obtaining the oscillating movement of the wiper arm. The instructions which the micro-processor sends to the second motor 15 are essentially instructions for starting, slowing down and stopping said motor 15, i.e. for moving radially with respect to the first drive shaft 12 an element or several elements of the wiper arm, as will be explained hereunder.

The thus described electronical system allows a given driving mechanism to be used not only on windshields of different configurations, but also to obtain on each windshield the optimal wiping pattern by just adequately programming the micro-processor.

In the first embodiment (FIG. 1) of the invention the rotational movement of the second drive shaft 13 is transmitted to the screw 8 via the conical gear 9a, 9b. The screw 8 rotates inside the elongate nut 7 which, because of its external form and because of the internal form of the housing 1 is locked rotationally. Thus the nut 7 moves radially with respect to the drive shaft 12 when the drive shaft 13 rotates, the direction of the radial movement depending on the direction of the rotational movement of the drive shaft 13. The nut 7 transmits its radial movement to the extension rod 10 and consequently to the mounting head 3, to the housing 2, to the extension rod 4 and to the hook 5.

It is to be noted that the elements 2, 3, 4, 5, 6 form in fact a conventional wiper arm wherein the housing 2 comprises a spring capable of pushing the housing 2, and consequently the wiper blade (not shown), towards the windshield of the vehicle.

In the second embodiment (FIGS. 6, 8) of the invention the wiper arm comprises the following elements: a housing 30, a housing 31a, a housing 31b, an extension rod 32, a rack 32a which is part of the extension rod 32, a mounting head 3 (the other elements of the conventional wiper arm not being shown) and a nut 35 which secures the housing 30 (and consequently the whole wiper arm) to the first drive shaft 12.

The second drive shaft 13 is provided with a pinion 33 which imparts a back and forth movement to the rack 32a as a function of the direction of rotation of said shaft 13. Since the rack 32a is a part of the extension rod 32 and since the extension rod 32 is rigidly secured to the mounting head 3, the whole conventional wiper arm (represented by the mounting head 3) also moves back and forth.

In the third embodiment (FIGS. 7, 9) of the invention the wiper arm comprises the following elements: a housing 40 which is secured to the first drive shaft 12 (screw 45, FIG. 9), a hollow screw 44 which is provided externally and internally with a thread and which, because it is locked at its end portions by the housing 40, can only rotate about its longitudinal axis, an extension rod 42 which is provided with a thread in its medium portion (screw 42a), and a mounting head 3 (the other elements of the conventional wiper arm not being shown).

The second drive shaft 13 is provided with a helical pinion 43 which, when rotating in one or the other direction, imparts a rotational movement to the hollow screw 44, which in turn, by means of its internal thread imparts a back and forth movement (depending on the direction of rotation of the shaft 13) to the screw 42a. Since said screw 42a is part of the extension rod 42 and since the extension rod 42 is rigidly secured to the mounting head 3, the whole conventional wiper arm (represented by its mounting head 3) also moves back and forth. It is to be noted that the extension rod 42 and the end portions of the housing 40 must have an external/internal form such that the rod 42 cannot rotate about its longitudinal axis.

On the figures corresponding to the second and to the third embodiment the opto-electronical control and regulating system is not shown. It is however evident that the same system can be applied to these two embodiments in exactly the same manner as in the first embodiment.

In the fourth embodiment (FIGS. 10, 11, 12) of the invention the wiper arm comprises the following elements: a mounting head 50, a nut 35 which secures the mounting head 50, and consequently the whole wiper arm, to the drive shaft 12, a housing capable of swivelling about the rivet 51a and comprising a spring 59 capable of pushing said housing 51 and the extension housing 52 towards the windshield of the vehicle, a motor 53 (second motor), a coupling 53a, an extension rod 53b, a screw 54, a nut 55 capable of acting as a slider with respect to the potentiometer 56 and a nut or connector 58 to which the wiper blade (not shown) is attached at 58a and which is capable of acting as a slider with respect to the extension housing 52.

When the motor 53 imparts a rotational movement (in one or the other direction) to the two screws 54, 57 via the extension rod 53b the nut or slider 55 and the nut or connector 58 move back and forth, depending on the direction of the rotational movement of the motor 53. Indeed the internal form of the extension housing 52 and the external form of the slider 55 and connector 58 are such that said two elements are locked rotationally. It is to be noted that the extension housing 52 is open on its bottom surface so as to allow the back and forth movement of the slider 55 and of the connector 58.

The slider 55 of the linear potentiometer 56 moving at the same time and in the same direction as the connector 58, will cause said potentiometer to indicate the position of the connector at each moment. In a similar way the angular potentiometer 12a will indicate the angular position of the drive shaft 12 and consequently the angular position of the wiper arm.

The control and regulating system of the fourth embodiment is thus similar to those of the preceding embodiments since the two potentiometers 56, 12a indicate "at each moment" the parameters or information on the position of the connector 58 (and consequently of the wiper blade) on the windshield. Just as before the information obtained by the potentiometers can be used for acting on the two motors of the driving mechanism. Furthermore the analog information obtained by the potentiometers can be transformed into digital information by an analog-digital converter.

The fifth embodiment of the invention, which is represented on FIG. 13 and FIG. 14, is in fact only a variant of the fourth embodiment and the two embodiments work in exactly the same manner, the only differences being:

(a) in the fourth embodiment the spring 59 is located beween the mounting head 50 and the motor 53, whereas in the fifth embodiment the corresponding spring 69 is located laterally with respect to the motor 63 (FIG. 14), and (b) in the fourth embodiment it is the rod system 12b, actuated by the first motor (not shown), which imparts the oscillating movement to the drive shaft 12, whereas in the fifth embodiment there is a direct coupling between the first motor 14 and the drive shaft 12.

The wiper arm of the fifth embodiment thus comprises the same elements as the fourth embodiment, i.e.: a mounting head 60, a nut 35 which secures the mounting head 60, and consequently the whole wiper arm, to the drive shaft 12, a housing 61 capable of swivelling about the rivet 61a and comprising a spring capable of pushing said housing 61 and the extension housing 62 towards the windshield of the vehicle, a motor 63 (second motor), a coupling 63a, an extension rod 63b, a screw 64, a nut 65 capable of acting as a slider with respect to the potentiometer 66 and a nut or connector 68 to which the wiper blade (not shown) is attached at 68a and which is capable of acting as a slider with respect to the extension housing 62. Just as for the fourth embodiment the element 12a is an angular potentiometer of which the slider is secured to the drive shaft 12.

In the sixth embodiment (FIGS. 15 to 18) of the invention the wiper arm comprises the following elements: a housing 70 which is rigidly secured to the first drive shaft 12, a housing 72 wherein is located the rack 72a, a housing 75 which is capable of swivelling about the axis formed by the two screws 75a (FIG. 17), an extension housing 76 wherein the connector 78 can move longitudinally, a rod system 74a, 80, 74b with the pivots 74a', 74a", 74b', 74b" and a spring 79 with its attachment rivets 79a, 79b.

The wiper arm according to the sixth embodiment thus comprises a pinion-rack system just as the wiper arm of the second embodiment. The element which forms the rack 72a has, in a top view (FIG. 18), a rectangular form and is provided with a rectangular opening 81. The teeth of the rack are provided on one of the walls of said rectangular opening 81. The pinion 73 (FIG. 18) of the second drive shaft 13 (not shown) imparts a back and forth movement to the rack 72a as a function of the direction of the rotational movement of said drive shaft 12.

The portion 72a' of the rack 72a links the rack to the rod 74a by means of the pivot 74a'. The intermediate element 80 links the rod 74a to the rod 74b by means of the two pivot pins 74a", 74b' and the connector 78 is linked to the rod 74b by means of the pivot pin 74b". The elements 74a, 80, 74b thus form a rod system which imparts to the connector the same back and forth movement as the one of the rack 72a. It is to be noted that the wiper blade (not shown) is attached at 78b to the connector 78 and that (FIG. 16) the housings 75, 76 and consequently the connector 78 and the wiper blade can slightly swivel about the axis formed by the two screws 75a. As before the opto-electronical control and regulating system can be applied to this sixth embodiment of the invention.

The first three embodiments of the invention have in commun the feature that the total length of the wiper arm varies as a function of time, or in other words, as a function of the angular position of the wiper arm. To the contrary, in the three last embodiments of the invention the total length of the wiper arm does not vary since it is only the connector 58, 68, 78 which moves back and forth in a wiper arm having a constant length.

Other variants or combinations between the different elements of the sixth embodiments of the invention can be imagined, such as for example:

1. The second slotted disc 15a can be replaced by a slotted plate 82 (FIG. 5) which is rigidly secured to one of the elements of the wiper arm capable of moving radially with respect to the first drive shaft 12. At F-E the reading head will read 0110 and at H-G it will read 1011.

2. The inverse, i.e. a slotted plate rigidly secured to a non-radially moving element of the wiper arm, can also be envisaged. In this case the reading head would move radially.

3. The opto-electronical system can replace the potentiometrical system on the wiper arms of FIGS. 10, 13 and the potentiometrical system can replace the opto-electronical system on the wiper arms of FIGS. 1, 6, 7, 15.

Six embodiments of the driving mechanism according to the invention have thus been described. It is however evident that modifications can be made without departing from the scope of the invention such as defined in the appended claims.

We claim:

1. A driving device for wiper blades of motor vehicles, comprising a first drive shaft (12), a first motor (14) for driving said first drive shaft, a wiper arm mounted on said first drive shaft and being driven in an oscillating movement by said first motor, said wiper arm having at least one element (3, 58, 68, 78) capable of moving radially with respect to said first drive shaft (12), characterized in that a second motor (15, 53, 63) imparts the radial movement to said one element (3, 58, 68, 78) that is capable of moving radially with respect to the first drive shaft (12).

2. A driving device according to claim 1, characterized in that the second motor (15) is located beneath the hood of the vehicle.

3. A driving device according to claim 2, characterized in that the rotational movement of the second motor (15) is transformed into a radial movement with respect to the first drive shaft (12) by means of a second drive shaft (13), a screw-nut system (8, 7) having a screw (8) and a nut (7), a mating pair of conical gears (9a, 9b) on said second drive shaft (13) and on said screw (8), said nut (7) being locked rotationally and dragging with it, in its radial movement, said at least one (3) of the elements of the wiper arm.

4. A driving device according to claim 3, characterized in that the first drive shaft (12) is hollow and that the second drive shaft (13) is located inside the first drive shaft (12).

5. A driving device according to claim 2, characterized in that the rotational movement of the second motor (15) is transformed into a radial movement with respect to the first drive shaft (12) by means of a second drive shaft (13) and a rack-pinion system (33, 32a; 73, 72a) having a rack (32a, 72a) and a pinion (33, 73), said rack dragging with it, in its radial movement, said at least one (3, 74a) of the elements of the wiper arm.

6. A driving device according to claim 5, characterized in that the first drive shaft (12) is hollow and that the second drive shaft (13) is located inside the first drive shaft (12).

7. A driving device according to claim 2, characterized in that the rotational movement of the second motor (15) is transformed into a radial movement with respect to the first drive shaft (12) by means of a second drive shaft (13) and a helical pinion (43) on said second drive shaft, said pinion (43) meshing with an external thread on a hollow screw (44), said hollow screw (44) is provided with an internal thread and is locked radially with respect to the first drive shaft (12), the internal thread of said hollow screw (44) imparting a radial movement to a second screw (42a), locked rotationally and dragging with it, in its radial movement, at least one (3) of the elements of the wiper arm.

8. A driving device according to claim 7, characterized in that the first drive shaft (12) is hollow and that the second drive shaft (13) is located inside the first drive shaft (12).

9. A driving device according to claim 1, characterized in that the second motor (53, 63) is located above the hood of the vehicle.

10. A driving device according to claim 9, characterized in that the second motor (53, 63) is located inside the wiper arm.

11. A driving device according to claim 10, characterized in that the rotational movement of the second motor (53, 63) is transformed into a radial movement with respect to the first drive shaft (12) by means of a screw-nut system (54, 57, 64, 67; 55, 58, 65, 68), said screw-nut system have a screw (54, 57, 64, 67) and a nut (55, 58, 65, 68) with said nut (55, 58; 65, 68) being locked rotationally and dragging with it, in its radial movement, said at least one elements (58a, 68a) of the wiper arm.

12. A driving device according to claim 1, characterized in that the radial movement of the element (3, 58, 68, 78), of the wiper arm is controlled as a function of the angular position of said wiper arm by means of an opto-electronical system comprising a microprocessor (19) which, by means of adequate power circuits (18), controls said first and second motors (14, 15, 53, 63).

13. A driving device according to claim 12, characterized in that the opto-electronical system comprises a first reading head (14b), a first slotted disc (14a) driven by the first motor (14) which imparts a rotational movement of the first slotted disc past the first reading head, and a second reading head (15b), and a second slotted disc (15a) driven by the second motor which imparts a rotational movement of the second slotted disc past the second reading head.

14. A driving device according to claim 13, characterized in that the opto-electronical system comprises a first reading head (14b), a first slotted disc (14a) driven by the first motor (14) which imparts a rotational movement to the first slotted disc past the first reading head, a second reading head (15b) and a slotted plate (82) attached to one of the elements of the wiper arm capable of moving radially with respect to the first drive shaft (12) for moving the slotted plate past the second reading head.

15. A driving device according to claim 1, characterized in that the radial movement of the element (3, 58, 68, 78), of the wiper arm is controlled as a function of the angular position of said wiper arm by means of a potentiometrical system (56, 66) comprising a microprocessor (19) which, by means of adequate power circuits (18), controls said first and second motors (14, 15, 53, 63).

* * * * *

UNITED STATES PATENT AND TRADEMARK OFFICE
CERTIFICATE OF CORRECTION

PATENT NO. : 4,707,641

DATED : November 17, 1987

INVENTOR(S) : Guerard et al

It is certified that error appears in the above-identified patent and that said Letters Patent is hereby corrected as shown below:

Column 6, line 38 after "shaft" change "12" to --13--

Signed and Sealed this

Thirty-first Day of May, 1988

Attest:

DONALD J. QUIGG

Attesting Officer

Commissioner of Patents and Trademarks

UNITED STATES PATENT AND TRADEMARK OFFICE
CERTIFICATE OF CORRECTION

PATENT NO. : 4,707,641

DATED : November 17, 1987

INVENTOR(S) : NORBERT GUERARD and CHRISTIAN BENETEAU

It is certified that error appears in the above-identified patent and that said Letters Patent is hereby corrected as shown below: On the title page:

Item 56 - the following prior art patents cited by the Examiner and applicant should be listed:

```
        2548605    - France
        3332931    - Germany
        0182123    - European Patent Publ.
        2162053    - Great Britain
U.S.    2,308,212  - Scott-Iversen et al.
U.S.    3,800,624  - Klement et al.
U.S.    4,447,928  - Schuch et al.
U.S.    4,512,056  - Wattier
U.S.    4,625,359  - Egner-Walter et al.
```

Signed and Sealed this

Fifth Day of June, 1990

*Attest:*

HARRY F. MANBECK, JR.

*Attesting Officer*  *Commissioner of Patents and Trademarks*